United States Patent
Sperger et al.

(10) Patent No.: US 6,342,970 B1
(45) Date of Patent: *Jan. 29, 2002

(54) DIELECTRIC INTERFERENCE FILTER SYSTEM, LCD-DISPLAY AND CCD-ARRANGEMENT AS WELL AS PROCESS FOR MANUFACTURING A DIELECTRIC INTERFERENCE FILTER SYSTEM AND USE OF THIS PROCESS

(75) Inventors: Reinhard Sperger, Feldkirch; Helmut Rudigier, Bad Ragaz; Peter Wierer, Bludenz; Helmut Schoech, Feldkirch, all of (AT)

(73) Assignee: Unaxis Balzers Aktiengesellschaft, Fuerstentum (LI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/789,581

(22) Filed: Jan. 28, 1997

Related U.S. Application Data

(63) Continuation of application No. 08/399,357, filed on Mar. 3, 1995, now abandoned.

(30) Foreign Application Priority Data

Mar. 3, 1994 (DE) .......................................... 44 07 067

(51) Int. Cl.[7] ................................................. G02B 1/10
(52) U.S. Cl. ...................... 359/587; 359/586; 359/589; 359/900; 349/80; 349/106; 348/273; 348/280
(58) Field of Search .................................. 359/587, 589, 359/590, 900, 580, 586; 349/80, 97, 104, 105, 106, 108, 110; 348/272, 273, 277, 280

(56) References Cited

U.S. PATENT DOCUMENTS

| | | | | |
|---|---|---|---|---|
| 3,771,857 A | * | 11/1973 | Thomasson et al. | ........ 359/587 |
| 3,839,039 A | * | 10/1974 | Suzuki et al. | ................ 396/661 |
| 3,914,464 A | * | 10/1975 | Thomasson et al. | ........ 430/321 |

(List continued on next page.)

FOREIGN PATENT DOCUMENTS

| | | | | |
|---|---|---|---|---|
| EP | 0 529 092 A1 | | 3/1993 | ............. G02B/5/20 |
| JP | 36-0159830 | * | 8/1985 | .................. 349/107 |
| JP | 36-2150221 | * | 7/1987 | .................. 349/106 |

(List continued on next page.)

OTHER PUBLICATIONS

T. Unate, et al., "An Active–Matrix Color LCD with High Transmittance using an Optical Interference Filter", Japan Display '89, pp. 434–347, Jan. 1989.*

B.J. Curtis, et al., "Fabrication of Mosaic Color Filters by Dry–Etching Dielectric Stacks", J. Vac. Sci. Techn., A 4 (1), pp. 70–74, Feb. 1986.*

Development of a Multicolour Super–Nematic Twisted–Display; M. Ohgawarea, H. Tsubota, M. Akatsuka, H. Koh, K. Sawada and K. Matsuhiro; Display Apr. 1991, pp. 65–73.

Colour Filters for LCDs; K. Tsuda; Displays. vol. 14, No. 2, 1993, pp. 115–123.

*Primary Examiner*—Cassandra Spyrou
*Assistant Examiner*—John Juba, Jr.
(74) *Attorney, Agent, or Firm*—Crowell & Moring LLP

(57) ABSTRACT

A dielectric interference filter system with at least filter elements of different spectral characteristics on the same carrier substrate is provided. The filter elements have the same height and/or adjoin each other without gaps. The system is used for, inter alia, interference color filter systems in the form of an LCD-display or CCD-arrangement. A process for manufacturing the system includes preparing at least one filter element by coating and subsequent etching, and preparing at least one subsequent filter element by coating and subsequent structuring utilizing lift-off in which the etching mask is used as the lift-off mask.

23 Claims, 5 Drawing Sheets

U.S. PATENT DOCUMENTS

| | | | | |
|---|---|---|---|---|
| 3,981,568 A | * | 9/1976 | Bartolomei | 359/590 |
| 3,997,810 A | * | 12/1976 | Tsutsui et al. | 313/384 |
| 4,029,394 A | * | 6/1977 | Araki | 359/590 |
| 4,182,647 A | * | 1/1980 | Yoshihara et al. | 156/659.1 |
| 4,534,620 A | * | 8/1985 | Gale et al. | 359/588 |
| 4,853,296 A | * | 8/1989 | Fukuyoshi | 428/623 |
| 5,059,500 A | * | 10/1991 | Needham et al. | 430/7 |
| 5,120,622 A | * | 6/1992 | Hanrahan | 430/7 |
| 5,164,858 A | * | 11/1992 | Aguilera, Jr. et al. | 359/587 |
| 5,217,832 A | * | 6/1993 | Joslin et al. | 359/590 |

FOREIGN PATENT DOCUMENTS

| | | | | | |
|---|---|---|---|---|---|
| JP | 1-172905 | | 7/1989 | | G02B/5/28 |
| JP | 2-37327 | | 2/1990 | | G02B/5/28 |
| JP | 40-4134427 | * | 5/1992 | | 349/106 |
| JP | 40-5045514 | * | 2/1993 | | 359/588 |
| JP | 40-5045515 | * | 2/1993 | | 359/588 |

* cited by examiner

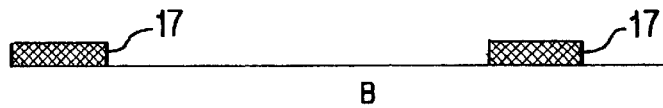
FIG. 10a
FIG. 10b
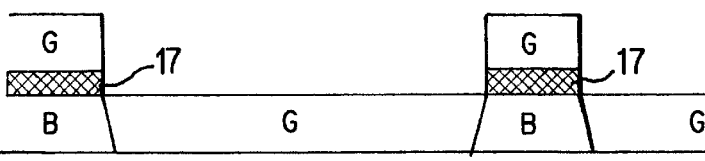
FIG. 10c
FIG. 10d
FIG. 10e
FIG. 10f
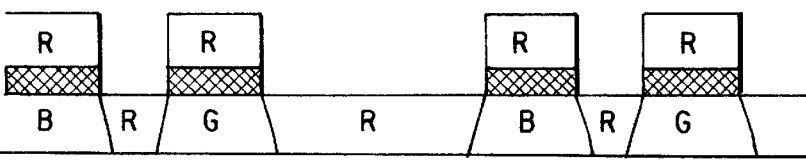
FIG. 10g
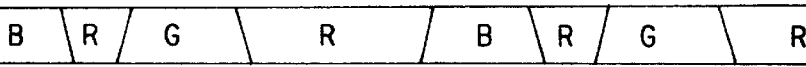
FIG. 10h

DIELECTRIC INTERFERENCE FILTER SYSTEM, LCD-DISPLAY AND CCD-ARRANGEMENT AS WELL AS PROCESS FOR MANUFACTURING A DIELECTRIC INTERFERENCE FILTER SYSTEM AND USE OF THIS PROCESS

This application is a continuation of U.S. patent application Ser. No. 08/399,357 filed Mar. 3, 1995, now abandoned.

BACKGROUND AND SUMMARY OF THE INVENTION

The present invention relates to a dielectric interference filter system having at least two filter elements built up on a common carrier and which spectrally operate differently, an Liquid Crystal Device (LSD), display as well as a charge coupled device (CCD) arrangement comprising a color filter system, a process for manufacturing the dielectric interference filter system, and use of the process for manufacturing interference color filter systems.

The term "dielectric interference filter system" refers herein to a system in which filter elements are provided side-by-side on a common carrier. When viewed above the wavelength, the filter elements have different transmission characteristics. They may be high-pass, low-pass, band-pass or band-stop filters.

"Transparent" layers refers to the fact that, in the spectral wavelength regions which are of interest with respect to the action of the filter elements, such layers have an essentially constant high transmission and low absorption values.

A "black matrix" is a layer or a layer system whose transmission vanishes for radiation in a spectral wavelength region which is specific with respect to the action of the filter elements.

Although the present invention specifically describes interference color filter systems, i.e., filter systems which operate with respect to colored wavelength ranges discernible by the human eye, it is to be clearly understood that the present invention may also be used in conjunction with interference filter systems which operate outside the wavelength range be discernable by the human eye.

A color filter system is an optical element which influences the spectral region of a light source visible to the human eye so that the resulting light radiation causes a specific color impression. The color may be expressed in the form of CIE-coordinates for whose computation the spectral characteristics (transmission or reflection) of the optical filter element, the spectral radiation distributions of the light source and the spectral sensitivity of the human eye are used, as defined in DIN-Standard 5033 (July 1970).

Basically, it is known, as described in K. Tsuda, "Color Filters for LCDs", *Displays*, Vol. 14, No. 2, P. 115 (1993), to implement color filter elements by using spectrally selective absorbing layers of a defined thickness d which are applied to a broadband high-transmitting substrate.

Such selectively absorbing layers consist of organic materials with an approximately constant refractivity n and with a highly wavelength-dependent extinction coefficient k ($\lambda$) In this case, the spectral transmission amounts to $$T(\lambda)=\exp\ [-4\cdot\pi\cdot d\cdot k(\lambda)\cdot\lambda^{-1}]$$

The above-mentioned article by K. Tsuda describes disadvantages of organic color filters or, within the scope of a filter system, organic color filter elements. These disadvantages are low color saturation, high absorption losses which may lead to an undesirable heating of the color filter or color filter element, insufficient chemical, mechanical and thermal stability, and insufficient geometric precision; i.e., fluctuations in the layer thickness and evenness of the surface.

A second approach, to which the present invention basically relates, is the implementation of optical filter systems, particularly color filter systems, with the use of dielectric thin-film systems which consist, for example, of alternately successive, relatively low-refracting layers, for example of $SiO_2$, and high-refracting layers, for example, of $TiO_2$, as described, for example, in H. A. Macleod, "Thin-Film Optical Filters", Adam Hilger Ltd. (1986).

Such layer systems are normally produced by vacuum coating processes, for example, by (a) vaporization techniques, such as electron beam vaporization, (b) arc vaporization or by sputter coating in DC-, AC- or mixed AC- and DC-plasmas, (c) by ion plating, which are all PVD-processes which can be used reactively or non-reactively, or (d) by CVD-processes or PECVD-processes (Plasma Enhanced Chemical Vapor Deposition Processes).

A corresponding desired spectral characteristic, expressed, for example, by the spectral transmission $T(\lambda)$, occurs in this second approach by the interference of the light which is reflected on the different interfaces of the layer system and is transmitted. The absorption may, by approximation, be neglected. Typically, the resulting overall thickness of such layer Systems is a function of the spectral region, particularly of the color which is to be transmitted by the filter element Thus, for example, a dielectric interference filter element for blue is the thickest because here the long-wave region of the visible spectrum must be blocked. Correspondingly, a red filter element is the thinnest. Reference is made in this respect to the above-mentioned "Thin-Film Optical Filters" publication by H. A. Macleod, as well as to "An Active-Matrix Color LCD with High Transmittance Using an Optical Interference Filter", *Japan Display* '89, Page 434 (1989), T. Unate, T. Nakagawa, Y. Matsushita, Y. Ugai and S. Aoki.

By way of optical monitoring methods, dielectric layer systems may be produced with a layer thickness precision of ±1%. In the case of typical overall thicknesses of dielectric interference color filter elements in the range of 1.5–3.5 $\mu$m, this tolerance an absolute precision deviation of, at most, 0.07 $\mu$m.

For structuring dielectric interference filter systems into individual filter elements, predominantly two techniques may be used. The first technique is etching where an applied layer system is etched in defined areas. For this purpose, an etching mask is applied to the initially unstructured layer system and, in areas not covered by the mask, the layer system situated underneath is removed by etching, as desired. In this technique, the etching may take place in a chemically wet manner but is preferably implemented by a vacuum process. For this purpose, reactive or non-reactive PVD-processes are suitable, such as DC-, AC- or AC- and DC-sputtering or reactive ion etching, the latter being of particular interest in the present context.

The second technique is the lift-off technique where a mask is applied to a carrier system situated underneath and the desired layer system is deposited over the mask. During the subsequent lift-off of the mask, the layer system, which is structured as desired, will then remain only on areas which previously had not been covered by the mask.

As previously above, the thickness of absorbing organic color filter elements fluctuates considerably because of the manufacturing tolerances of the organic material layers. In dielectric interference filter systems, the overall thickness of the filter element layer systems will fluctuate because of the numbers and thicknesses of the layers which are required for the endeavored spectral characteristics.

In many applications of filter systems in which filter elements, which spectrally have different effects, are constructed side-by-side on the same carrier, the reaching of the same levels for all provided filter elements which have different spectral effects would be highly desirable. A typical example and an application to which the present invention also relates specifically are LCD-displays. FIG. 1 is a cross-sectional view of the basic construction of a known color-LCD-display. On a substrate 1, color filter elements 3 are situated in the active range of the display, that is, in that range in which the image is created. For example, the color filter elements 3 are red "R", green "G" and blue "B". As shown in FIG. 1 partly under and between the elements 3, black matrix elements 5, as above defined, are built in under, between or above the color filter elements 3. The black matrix elements 5 are typically made of chromium and, depending on the desired optical density, have a thickness of from 0.1 to 0.2 μm. An electrically conductive transparent layer 7, typically an indium-tin-oxide layer ITO, which, depending on the display type, is divided into areas or is continuous, is situated above the color filter elements 3.

Between the color filter elements 3 and the electrically conductive transparent layer 7, typically an organic compensation layer 9, made, for example, of acrylic, is built to carry out the functions of (a) compensating uneven thicknesses of the different color filter elements and unevennesses on the individual color filter element surfaces and thus permitting a constant cell thickness for the liquid crystal 10; (b) representing a mechanically more stable layer and preventing spacers such as constant diameter small balls for maintaining a constant distance between the layers 7 and 13 from being pressed into the softer organic color filter layers, it should be stressed at this point that up to now mainly absorbing organic color filter elements 3 have been used; (c) implementing an electric insulation between the electrically conductive layer 7 and the black matrix elements 5; and (d) preventing the electrically conductive layer 7, particularly an ITO layer, which is built up directly on color filter elements which have different thicknesses and/or are separated by gaps, from tearing at the edges of the color filter elements whereby electric connections would be interrupted.

Apart from additional manufacturing process steps which are required by the providing the compensation layer 9, the foregoing example has similar disadvantages as the color filter layers made of organic material, specifically insufficient chemical, mechanical and thermal stability; and problematic adhesion on organic color filter elements or on the substrate 1 which is normally made of glass.

According to FIG. 1, depending on the type of display, an electrically conductive layer 13 which is continuous or divided into fields (normally an ITO-layer or a more complex electronic layer structure which, however, is transparent at least in sections, as, for example, for forming so-called TFT's or Thin Film Transistors) is disposed on the substrate 11 situated opposite the color elements 3. A liquid crystal layer 10 is provided in the space between the two electrically conductive layers 7 and 13. The thickness of the layer 10 typically amounts to 5 to 10 μm; however, in special cases, for example, in the case of ferro-electric LCDs, it will even only have a thickness of 1.5 to 2.5 μm. The optical contrast and therefore the image quality of such an LCD-display depends directly on the constancy of the thickness of the cell 10 and, along the whole display surface, should not deviate more than 0.1 to 0.2 μm from the mean value, as discussed in M. Ohgawara, H. Tsubota, T. Kuwata, M. Akatsuka, H. Koh, K. Sawada and K. Matshiro, "Development of a Multicolour Super-Twisted Nematic Display", *Displays*, Page 65 (April 1991). As mentioned above, the distance between the layers 7 and 13 which is as constant as possible is set by the spacers in the form of constant diameter small balls.

Dielectric interference filter systems are used only infrequently in conjunction with LCD-displays or with CCD-devices. In this regard, reference is made to "An Active Matrix Color LCD with High Transmittance Using an Optical Interference Filter", *Japan Display*, '89, Page 434 (1989), as well as to B. J. Curtis, M. T. Gale,.H. W. Lehmann, H. Brunner, H. Schuetz and R. Widmer, "Fabrication of Mosaic Color Filters by Dry-Etching Dielectric Stacks", *J. Vac. Sci. Technol.*, Vol. A4, No. 1, Page 70 (1986) This use is infrequent even though dielectric layer systems, as compared with organic layers, have a much higher chemical and thermal stability and mechanical strength. As a result, these systems offer the following advantages for process steps taking place after their depositing as well as in the operation:

(1) resistance to mechanical and chemical cleaning and process steps;

(2) resistance to high temperature processes, e.g., during the depositing of a compensation layer 9 or sputter coating with an ITO layer 7 according to FIG. 1;

(3) good surfaces for the adhesion of a conductive layer, particularly an ITO-layer;

(4) mechanically stable base as a coating carrier base, for example, for the ITO-layer;

(5) mechanically stable base for spacers in the liquid crystal space 10;

(6) high optical quality, like high transmission, stronger color saturation, lower absorption and high optical long-term stability.

However, as mentioned above, a problem still remains in the establishment of interference filter systems due to the different filter element thicknesses d shown in FIG. 1.

It is, therefore, an object of the present invention to provide an interference filter system which obviates the need for an organic compensation layer to provide geometrical compensation reasons and eliminates the disadvantages of filter systems which are based on organic absorption filter elements, as well as those of known interference filter systems.

Furthermore, an LCD-display according to the present invention or a CCD-arrangement according to the present invention is to be provided, as well as a process by way of which filter systems can be manufactured which solve the above-mentioned objective.

The foregoing is achieved in accordance with the present invention in a dielectric interference filter system by providing that the overall thickness of the interfering layers on the filter elements are identical, except for manufacturing tolerances, and that at least two filter elements adjoin one another laterally without gaps.

Systems with filter elements of the same height as well as filter elements which adjoin one another without gaps create conditions which allow, for example, without compensation layers, an electrically conductive layer, such as an ITO-layer, to be directly applied In LCD-applications other than the specified application, however, an interference filter system having filter elements of the same height or an interference filter system having filter elements which adjoin one another without gaps also result in important advantages. The reason is that, surprisingly, it is possible to meet the different spectral demands made on the filter elements, as, for example and particularly on the transmission of colors, particularly red, green and blue, also in the case of the same thickness d of the different filter elements. The arrangement of filter elements which adjoin one another without gaps according to the present invention is also surprising when it is considered that, when an etching technique is used, specifically gaps are etched and, in the case of a lift-off technique gaps are also created by the lift-off.

In a currently preferred embodiment of the filter system according to the present invention, the filter elements are covered by a common interfering layer system which must therefore be taken into account during the optimization of the thickness of the filter elements. The common interfering layer system is transparent in the spectral regions in which the filter elements operate. It comprises preferably at least one electrically conductive layer, preferably consisting exclusively of an electrically conductive layer such as an ITO-layer Although, a compensation layer above the filter elements can be provided similar to layer 9 of FIG. 1 and whose thickness influences the spectral characteristics of the filter elements only insignificantly, preferably and particularly in the combination of the filter system characteristics according to the present invention, only an electrically conductive layer, preferably an ITO-layer, is provided above the filter elements. Furthermore, black matrix elements may also be provided.

Also, a process according to the present invention, an etching technique creates gaps, specifically where the etching mask has exposed areas, and the lift-off technique closes gaps, specifically where the lift-off mask has exposed areas. Thus, according to the present invention, a no-gap formation of the filter elements is permitted in that basically filter elements are created first by an etching technique and then filter elements are created by the lift-off technique, in which case the mask which was previously used as an etching mask will subsequently be used as a lift-off mask. As a result, the specific characteristic of the lift-off technique is optimally combined with that of the etching technique. The lift-off technique also permits the creation of a reference plane in the lift-off mask plane, specifically when it closes gaps between filter elements previously formed by the etching technique.

For coating by way of the layer system which forms the first filter element, PVD-, CVD- or PECVD-processes are preferably used. For etching, wet-etching processes may be used. However, plasma etching processes with AC-, DC- or mixed AC- and DC-plasmas are used reactively or non-reactively, but reactive ion etching is preferred. Furthermore, a mask made of a metal, preferably made of aluminum or chromium, is preferably used as the etching and lift-off mask, but a lacquer may also be used as a mask material.

In a currently preferred embodiment, particularly with respect to LCD- and CCD-arrangements, the interference filter system according to the present invention is configured as a dielectric color filter system.

Preferably used materials for the filter elements, particularly when they are used as color filter elements, are at least two of oxides or oxynitrides of Si, Hf, Ti, Zr, Ta, Nb, Al or mixtures thereof, and (b) $MgF_2$, Zns, $Si_3N_4$. In conjunction with FIG. 1, a person skilled in the art will easily recognize the advantages of an LCD-display or of a CCD-arrangement.

The process according to the present invention, which is particularly suitable for the production of interference color filter systems, is further characterized by at least one first interference filter element by coating, and subsequent etching with an etching mask, and subsequently preparing at least one second interference filter element by coating and subsequent lift-off structuring, with the etching mask being used as a lift-off mask. Moreover, more than one different interference filter element is prepared successively by coating and etching, and the last interference filter element is prepared by a lift-off technique

BRIEF DESCRIPTION OF THE DRAWINGS

These and further objects, features and advantages of the present invention will become more readily apparent from the following detailed description thereof when taken in conjunction with the accompanying drawings wherein:

FIG. 10 is a schematic view of the manufacturing sequence of an interference filter system of the invention according to FIG. 2 or FIG. 3 but, particularly FIG. 4, according to the present invention.

DETAILED DESCRIPTION OF THE DRAWINGS

Figure 1:
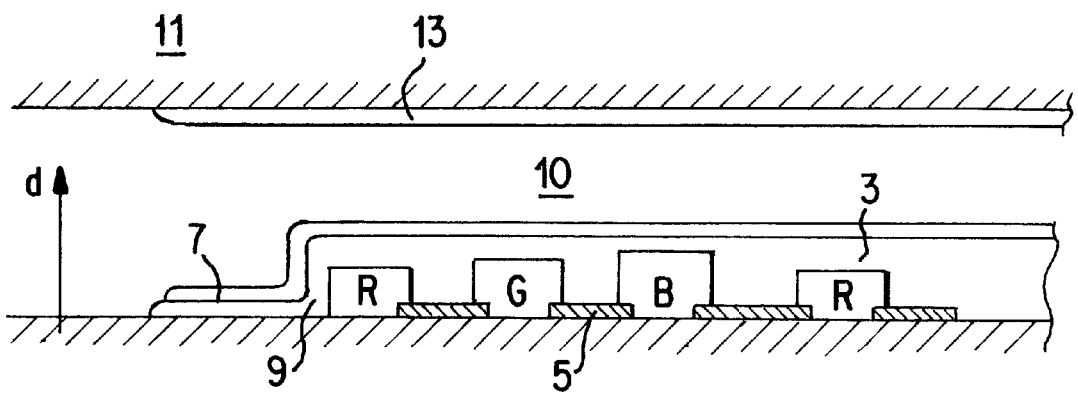
FIG. 1 is a schematic cross-sectional view of an LCD-display of a known construction discussed above.

FIG. 1, which illustrates a known LCD-structure and has been described in detail above, shows, in a greatly exaggerated manner, the thickness differences for dielectric interference color filter elements 3.

Figure 2:
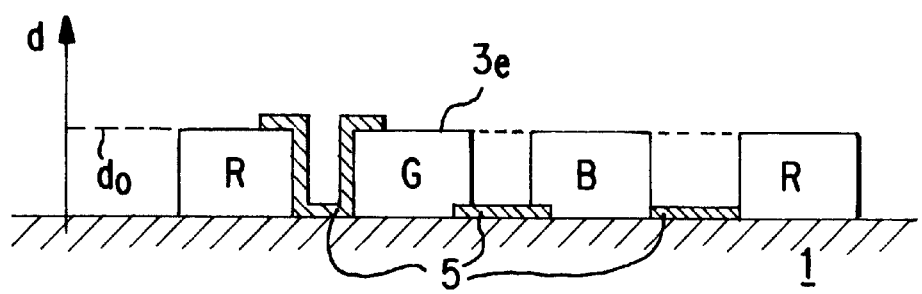
FIG. 2 is a schematic view similar to FIG. 1 but of a first embodiment of the filter elements on an interference filter system, particularly a color filter system, according to the present invention.

FIG. 2 shows schematically the arrangement of the filter elements 3 above the substrate 1, according to the present invention, particularly for a red, green and blue transmission. With the exception of the unavoidable manufacturing tolerance of the individual layers (not shown), the number and the thickness of the layers are optimized such that all filter elements $3_e$ have the same thickness $d_o$. This optimization can optionally include the spectral characteristics of the substrate 1 as well as of additional layers (not shown)

which can also be provided to cover the filter elements $3_e$ for optimization of the respective spectral filter element characteristics. Depending on the purpose of the filter system according to the present invention with the dielectric interference filter elements $3_e$ of the same height, as illustrated schematically in FIG. 2, black matrix elements 5 may be provided below, between or above the filter elements $3_e$.

Figure 3:
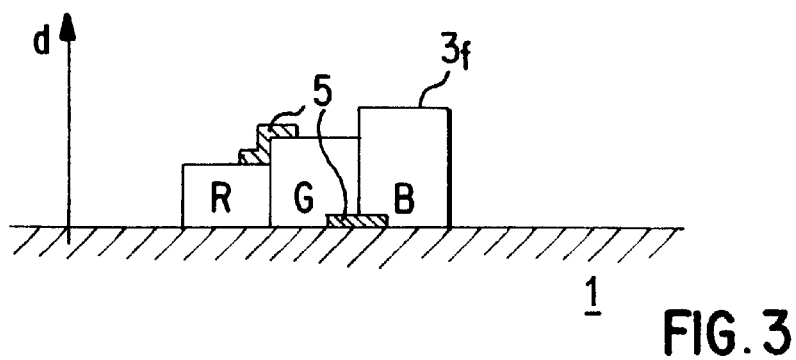
FIG. 3 is a schematic view similar to FIGS. 1 and 2 but of a second embodiment of the filter elements on an inference filter system, particularly a color filter system according to the present invention.

FIG. 3 shows a second embodiment which, by itself, is essential to the present invention, on the filter system with dielectric interference filter elements $3_f$ according to the present invention. Whereas the filter elements 3 in FIGS. 1 and 2 set gaps between one another, the filter elements $3_f$ in FIG. 3 adjoin one another without gaps, i.e. abut one another. As illustrated, black matrix elements 5 may also be built in, depending on the end use or application.

Figure 4:
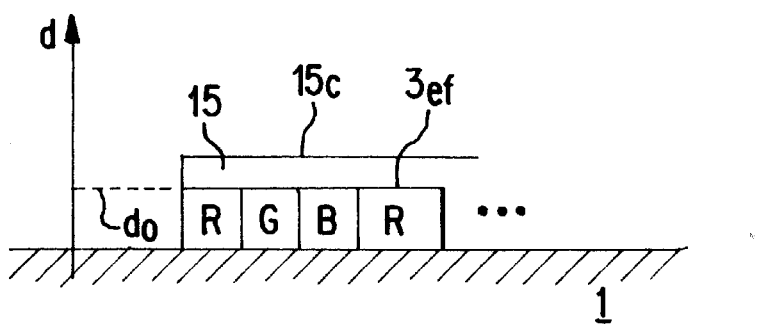
FIG. 4 is a schematic view of a preferred combination of the embodiments according to FIGS. 2 and 3, with a electrically conductive common cover layer in accordance with the present invention.

In the currently preferred embodiment according to FIG. 4, the respective inventive features of an interference filter system are combined. Therefore, the filter elements $3_{ef}$, on one hand, have the same thicknesses as in FIG. 2; while, on the other hand, they adjoin one another without gaps as in FIG. 3. As illustrated in FIG. 4, it is therefore now possible to deposit a layer system or a layer of a constant thickness directly on the filter elements $3_{ef}$, particularly, for example, an electrically conductive ITO-layer. In this embodiment, the color filter elements $3_{ef}$ form a mechanically stable reference plane of the construction of layer 15, and also form an electrically insulating depositing surface. Consequently, the layer 15 can be built up with a constant thickness, particularly if, as in the case of LCD-applications, their free surface $15_o$ must be situated on a well-defined parallel plane with respect to the substrate 1.

As discussed above, when the filter system according to the present invention is used as a color filter system for LCDs, an additional organic compensation layer 9 of FIG. 1 will not be necessary because an electrically conductive layer, particularly an ITO-layer or a layer stack made, for example, of $SiO_2$/ITO, due to the good adhesion to dielectric layer systems, can be applied without any problems directly to the filter elements. Also, the applied, electrically conductive layer within the active filter system range will not encounter edges on the filter elements on which it could tear off, and the electrically conductive layer is insulated with respect to the black matrix elements disposed under the filter elements by the filter elements themselves.

EXAMPLE 1

Figure 5:
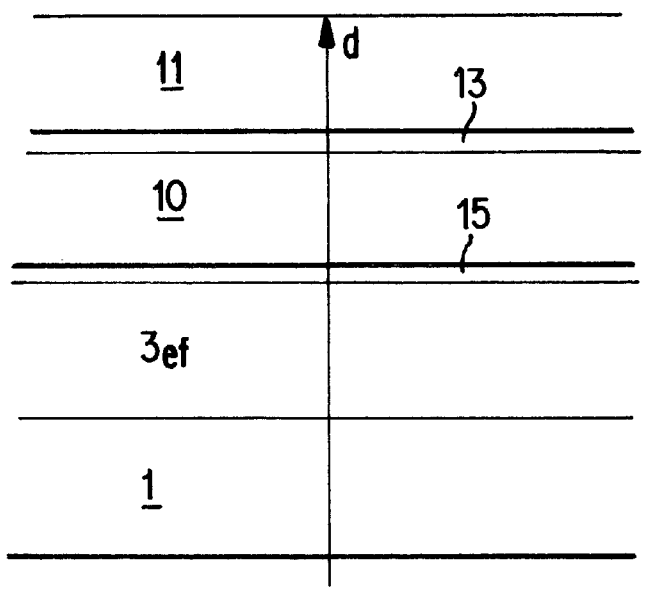
FIG. 5 is a cross-sectional view of the layer structure of a red, green, blue LCD-display constructed according to an Example 1 described below.

The construction of an LCD-display according to the invention with the use of a color filter system according to FIG. 4 of the invention is schematically shown in FIG. 5. The color filter elements $3_{ef}$ and, above them, the electrically conductive ITO-layer 15 are situated on the substrate 1. The ITO-layer 15 is followed by the liquid crystal layer 10, the electrically conductive ITO-layer 13, and the substrate 11.

Together with the ITO-layer 15, the layer stacks of the color filter elements $3_{ef}$ in FIG. 5 each form an interference-capable system, which is why the ITO-layer must be taken into account during the optimization of the respective color filter elements to prevent an additional transmission loss occurring as a result of the ITO-layer.

First, the target values for the color coordinates of the R-, G- and B-filter elements are determined. In this example, these are the color coordinates for color television according to the E.B.U. D 28-1980 (E) Standard "The Chromaticity of the Luminophors of Television Receivers".

Then, a thin-film system consisting of $SiO_2$ (n=1.46; k=0) and $TiO_2$ ($n_{350\,nm}$=2.55, $n_{550\,nm}$=2.35, $n_{900\,nm}$ −2.22; k=0) is optimized such that the blue color coordinates are reached within a predetermined tolerance. In this case, $n_{substrat}$=1.52

$n_{ITO}$=2

$d_{ITO}$=110 nm $n_{LC}$−1.52

Absorption for all optical layers is assumed to be negligible. Then the green and red filter element layer systems are similarly optimized such that the corresponding color coordinates are reached within predetermined tolerances and the overall thickness in each case to that of the blue filter element layer system. Table 1 shows under Example 1 the resulting color coordinate values and the layer construction of the "red", "green" and "blue" filter elements. The resulting overall thickness of the color filter elements corresponds to ±0.2 nm.

Figure 7:
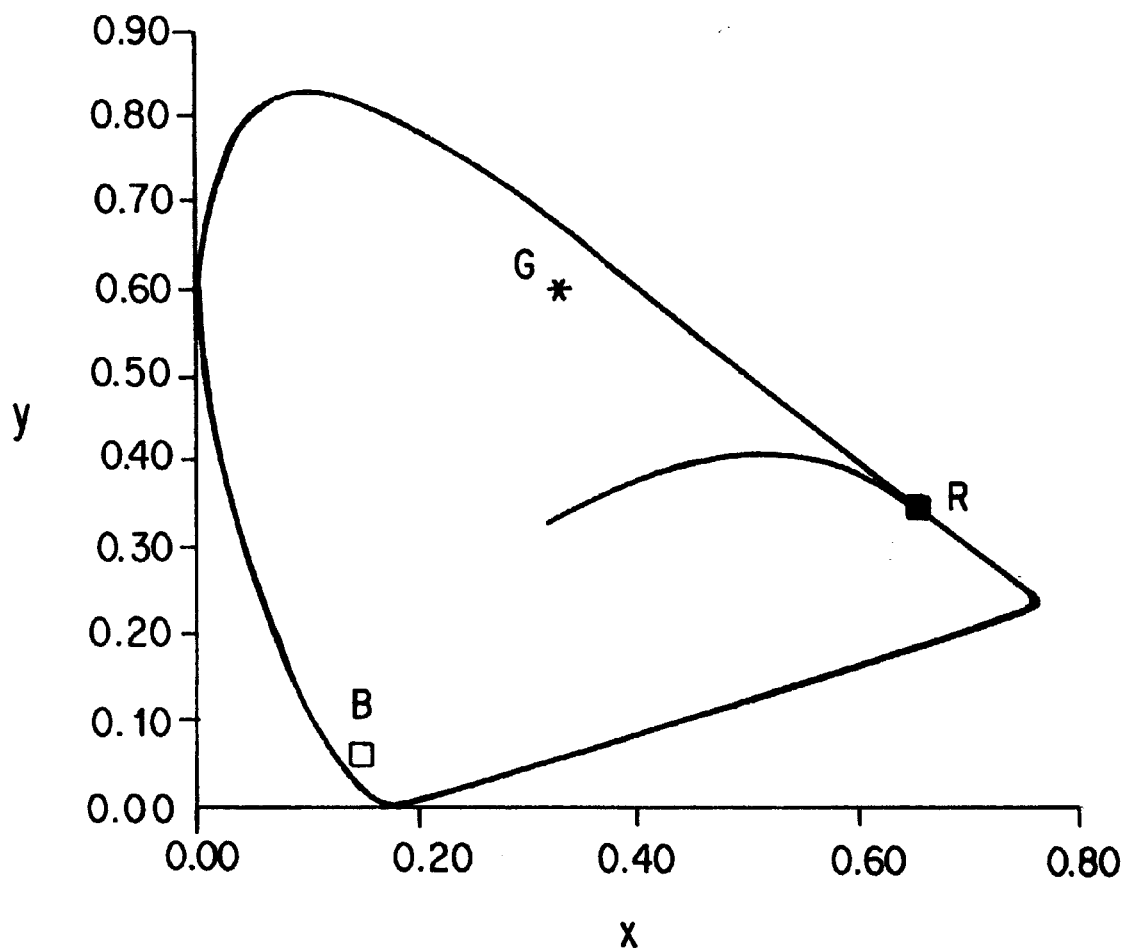
FIG. 7 is a view of the position of the color coordinates of the red, green and blue color filter elements according to Examples 1 and 2.
Figure 8:
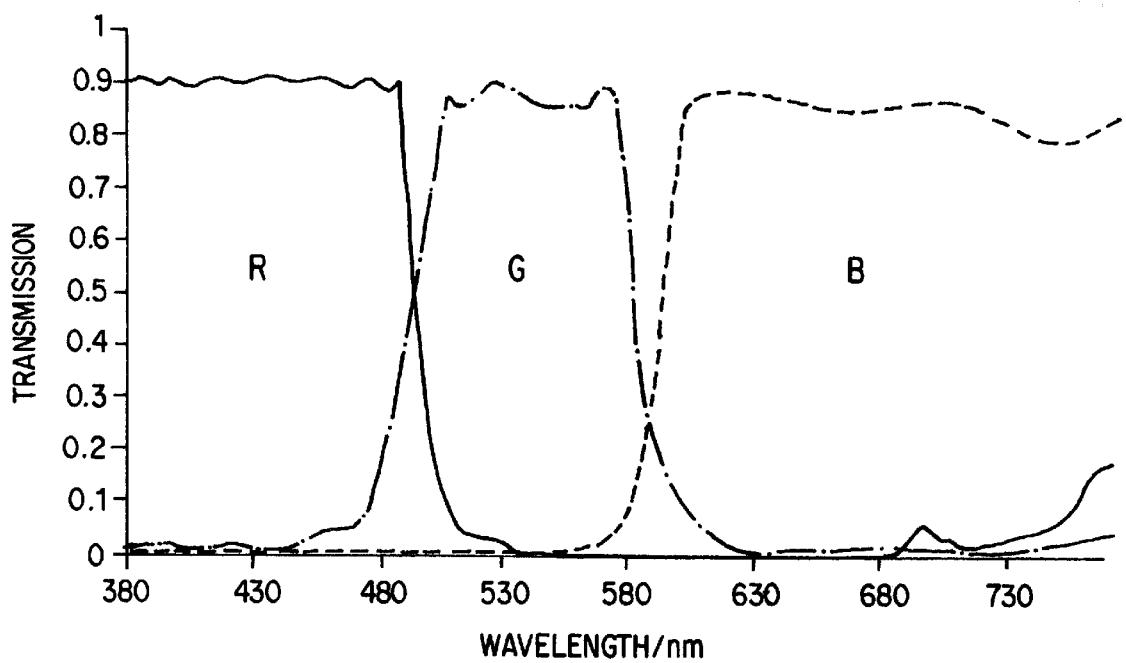
FIG. 8 is a view of the spectral transmission course on the red, green, and blue color filter elements on the filter system of the present invention according to Example 1.

FIG. 7 shows the resulting color coordinate values. FIG. 8 shows the spectral characteristics of the color filter elements implemented according to Example 1, including the substrate, the ITO-layers and the LC-layer.

EXAMPLE 2

Figure 6:
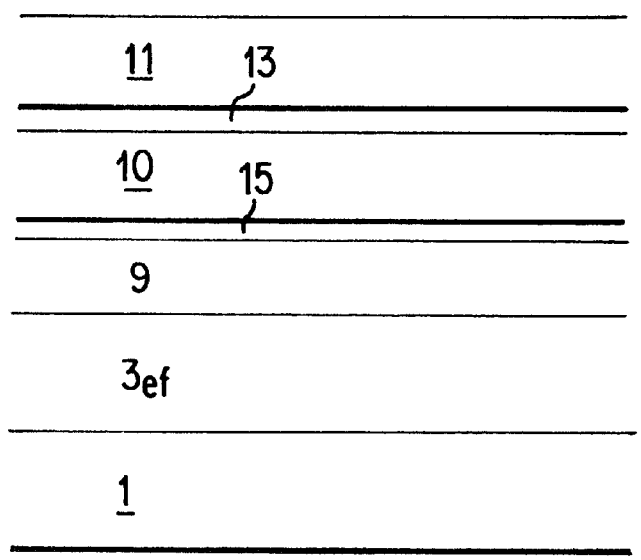
FIG. 6 is a representation of an LCD-display constructed according to an Example 2 described below.

FIG. 6 illustrates schematically the construction of a second embodiment of an LCD-screen with the filter system according to the present invention. The same reference numbers are used as in FIG. 5 to designate similar elements. With respect to the construction according to FIG. 5 and Example 1, however, a compensation layer 9 is provided in the embodiment of FIG. 6 between the filter elements $3_{ef}$ of the optical filter system and the ITO-layer 15. Thereby, the ITO-layer acts as an individual insulating layer. That is, in parts of the visible spectrum, the ITO-layer 15 reduces the transmission without compensation by the color filter elements $3_{ef}$. The process for determining target values and optimizing is identical with that of Example 1. $n_p$=1.46 is assumed for the

TABLE 1

Result of Thin Film Optimization from Examples 1 and 2;
H . . . $TiO_2$-Layers, L . . . $SiO_2$-Layers

|  |  | Example: | | | | | |
| --- | --- | --- | --- | --- | --- | --- | --- |
|  |  | 1 | | | 2 | | |
|  |  | Red | Green | Blue | Red | Green | Blue |
| Color | x: | 0.647 | 0.317 | 0.141 | 0.653 | 0.317 | 0.141 |
| Coordinates: | y: | 0.350 | 0.598 | 0.061 | 0.346 | 0.598 | 0.061 |
|  | Y: | 17.4% | 61.6% | 5.4% | 15.6% | 61.6% | 5.4% |

TABLE 1-continued

Result of Thin Film Optimization from Examples 1 and 2;
H . . . TiO$_2$-Layers, L . . . SiO$_2$-Layers

Figure 9:
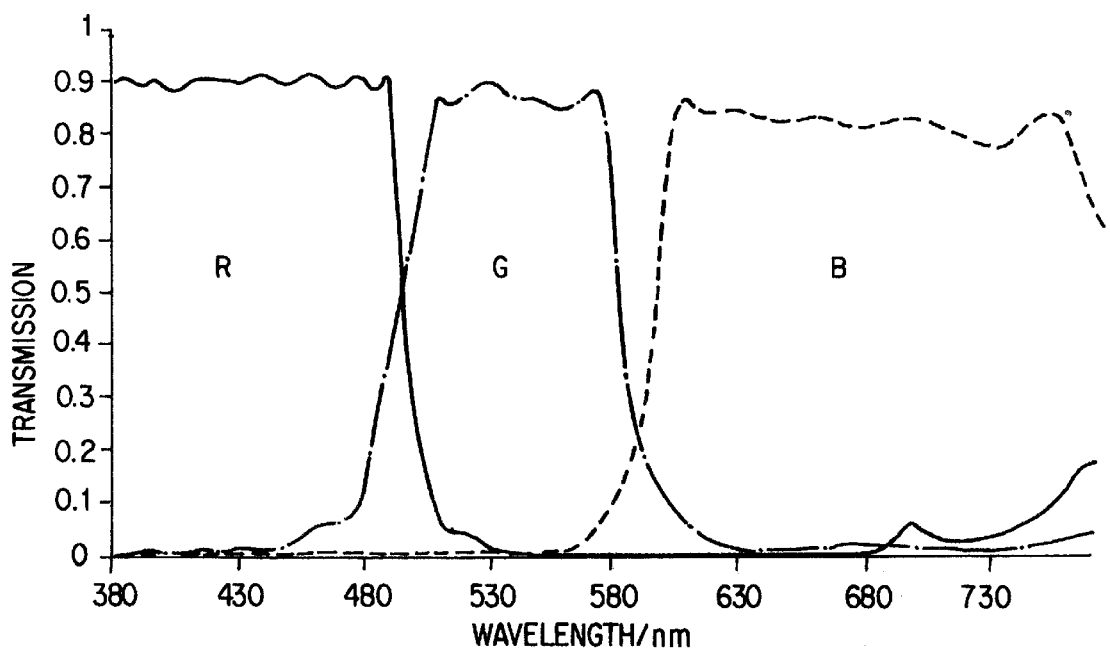
FIG. 9 is a view of the course similar to FIG. 8 for the color filter elements on the filter system of the is present invention but according to Example 2.

|  |  |  | Example: 1 | | | Example: 2 | | |
|---|---|---|---|---|---|---|---|---|
|  |  |  | Red | Green | Blue | Red | Green | Blue |
| Layer | 1 | L | 19.0 | 0.0 | 0.0 | 0.0 | 0.0 | 0.0 |
| Construction | 2 | H | 24.9 | 43.0 | 77.2 | 24.9 | 43.5 | 77.2 |
| (Thicknesses | 3 | L | 69.6 | 33.0 | 98.0 | 69.6 | 33.3 | 98.0 |
| in nm): | 4 | H | 43.0 | 38.5 | 63.2 | 43.0 | 38.9 | 63.2 |
|  | 5 | L | 69.6 | 95.3 | 105.4 | 69.6 | 96.2 | 105.4 |
|  | 6 | H | 43.0 | 40.7 | 56.2 | 43.0 | 41.2 | 56.2 |
|  | 7 | L | 51.3 | 66.0 | 105.4 | 51.3 | 66.6 | 105.4 |
|  | 8 | H | 38.5 | 40.7 | 56.2 | 38.5 | 41.2 | 56.2 |
|  | 9 | L | 69.6 | 66.0 | 105.4 | 69.6 | 66.6 | 105.4 |
|  | 10 | H | 43.0 | 40.7 | 56.2 | 43.0 | 41.2 | 56.2 |
|  | 11 | L | 69.6 | 66.0 | 105.4 | 69.6 | 66.6 | 105.4 |
|  | 12 | H | 45.2 | 56.6 | 56.2 | 45.2 | 50.3 | 56.2 |
|  | 13 | L | 66.0 | 58.6 | 105.4 | 66.0 | 70.3 | 105.4 |
|  | 14 | H | 43.0 | 43.0 | 58.5 | 43.0 | 34.3 | 58.5 |
|  | 15 | L | 40.3 | 183.2 | 101.7 | 40.3 | 188.6 | 101.7 |
|  | 16 | H | 52.0 | 70.1 | 67.9 | 52.0 | 70.9 | 67.9 |
|  | 17 | L | 69.6 | 117.2 | 98.0 | 69.6 | 118.3 | 98.0 |
|  | 18 | H | 58.8 | 70.1 | 77.2 | 58.8 | 70.9 | 77.2 |
|  | 19 | L | 62.3 | 117.2 | 116.7 | 62.3 | 118.3 | 116.7 |
|  | 20 | H | 58.8 | 70.1 | 77.2 | 58.8 | 70.9 | 77.2 |
|  | 21 | L | 69.6 | 117.2 | 116.7 | 69.6 | 118.3 | 116.7 |
|  | 22 | H | 72.4 | 70.1 | 77.2 | 72.4 | 70.9 | 77.2 |
|  | 23 | L | 58.6 | 117.2 | 116.7 | 69.6 | 118.3 | 116.7 |
|  | 24 | H | 65.6 | 70.1 | 79.6 | 65.6 | 70.9 | 77.2 |
|  | 25 | L | 69.6 | 117.2 | 98.0 | 58.6 | 118.3 | 116.7 |
|  | 26 | H | 70.1 | 95.0 |  | 65.6 | 89.2 | 79.6 |
|  | 27 | L | 69.6 | 58.6 |  | 69.6 | 92.5 |  |
|  | 28 | H | 63.3 | 113.1 |  | 70.1 | 105.2 |  |
|  | 29 | L | 55.0 |  |  | 69.6 | 59.2 |  |
|  | 30 | H | 65.6 |  |  | 63.3 |  |  |
|  | 31 | L | 73.3 |  |  | 55.0 |  |  |
|  | 32 | H | 52.0 |  |  | 65.6 |  |  |
|  | 33 | L | 252.8 |  |  | 73.3 |  |  |
|  | 34 | H |  |  |  | 67.9 |  |  |
|  | 35 | L |  |  |  | 44.0 |  |  |
|  | 36 | H |  |  |  | 40.7 |  |  |
|  | 37 | L |  |  |  | 131.9 |  |  |
| Overall thickness: |  |  | 2074.8 | 2074.5 | 2075.4 | 2170.6 | 2170.9 | 2171.4 | compensation layer. FIGS. 7 and 9 of the table again show the result of such an optimization. Table 1 illustrates that the overall thicknesses of the color filter elements coincide to deviations of less than 1 nm, specifically to ±0.25 nm.

EXAMPLE 3

With respect to FIG. 10, the manufacturing process according to the present invention, will be explained by reference to the following eight steps Step 1

The substrate is coated with the first interference filter system B, particularly with a first color filter system, such as blue "B".

Step 2

An etching mask 17, for example, a chromium mask, is applied to the deposited layer system, for example, by lithography or the like.

Step 3

The applied layer system B is structured by etching, preferably by reactive ion etching, such that the first filter elements of the first spectral characteristic, here for the example, the blue color "B" filter elements, are prepared.

Step 4

While the etching mask 17 remains, coating of the second spectral characteristic, here for example, with the green "G" layer system on the etching mask 17 and on the substrate, takes place.

Step 5

A second etching mask 19 again, for example, a chromium etching mask, is applied to the green color "G" layer system by lithography or other acceptable process.

Step 6

By way of etching, the second filter elements of the second spectral characteristic, such as the green color "G" filter elements, are prepared. The etching is again preferably carried out by means of reactive ion etching.

Step 7

While the first and second etching masks 17 and 19 remain, coating is carried out by the third layer system corresponding to the desired third spectral characteristic, such as the red "R" characteristic As a result, all gaps are closed between the already applied filter elements B, G.

Step 8

By use of the lift-off technique, the last-applied layer system is structured, in which case the previously used etching masks 17, 19 are now used as lift-off masks which are removed.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Dielectric interference filter system comprising at least two filter elements on a common carrier, each of the filter elements with a multitude of interference layers and spectrally different operational characteristics, the filter elements being laterally distinct from each other, wherein overall thicknesses of interference layers on each of the at least two filter elements differ by no more than 1% of the overall thickness of interference layers on each of the other of said at least two filter elements.

2. The system according to claim 1, wherein the at least two filter elements abut one another laterally.

3. The system according to claim 1, wherein the at least two filter elements are covered by a common interfering layer system configured to be transparent at least in operational spectral regions of the filter elements.

4. The system according to claim 3, wherein the common layer system comprises at least one electrically conductive ITO-layer.

5. The system according to claim 4, wherein the at least two filter elements abut one another laterally.

6. The system according to claim 1, wherein at least one black matrix element is operatively arranged at an at least one location in relation to the filter elements.

7. The system according to claim 6, wherein the at least two filter elements abut one another laterally.

8. The system according to claim 7, wherein the at least two filter elements are covered by a common interfering layer system configured to be transparent at least in operational spectral regions of the filter elements.

9. The system according to claim 1, wherein at least one first filter element is configured by coating, and by a subsequent etching, at least one second filter element is configured by coating, and a subsequent lift-off, and an etching mask for the at least one filter element is used as a lift-off mask for preparing the at least one second filter element.

10. The system according to claim 9, wherein the coating used to configure the at least one first filter element is one of a reactive or non-reactive PVD process and a CVD or PECVD process, and the etching is one of a reactive etching and a non-reactive AC,DC-, AC-plasma, DC-plasma etching.

11. The system according to claim 10, wherein the coating used to configure the at least one second filter element is the same as the first-mentioned coating.

12. The system according to claim 11, wherein the etching mask is one of a metal and lacquer.

13. The system according to claim 12, wherein the metal is one of Al and Cr.

14. The system according to claim 1, wherein the system constitutes a dielectric color filter system.

15. The system according to claim 1, wherein the filter elements comprise layers of at least two of the materials selected from the group consisting of (a) oxides or oxynitrides of Si, Hf, Ti, Zr , Ta, Nb, Al and (b) $MgF_2$,ZnS, $Si_3N_4$.

16. LCD-display including a color filter system incorporating a dielectric interference filter system, comprising at least two filter elements with spectrally different operational characteristics on a common carrier, each of the filter elements being laterally distinct from each other, wherein overall thicknesses of interference layers on each of the at least two filter elements differ by no more than 1% of the overall thickness of interference layers on each of the other of said at least two filter elements.

17. CCD-arrangement including a color filter system incorporating a dielectric interference filter system comprising at least two filter elements with spectrally different operational characteristics on a common carrier, each of the at least two filter elements being laterally distinct from each other, wherein overall thicknesses of interference layers on each of the at least two filter elements differ by no more than 1% of the overall thickness of interference layers on each of the other of said at least two filter elements.

18. A method of manufacturing an interference color filter system having at least three filter elements on a common carrier, comprising:

preparing a first multilayer interference color filter layer by coating said common carrier;

applying a first etching mask on said first interference color filter layer;

plasma etching said first multilayer interference color filter layer with said first etching mask, thereby obtaining first interference color filter elements covered with said first etching mask and first uncovered areas of said carrier;

preparing a second multilayer interference color filter layer by coating upon said first etching mask and said first uncovered areas of said carrier;

applying a second etching mask upon said second multilayer interference color filter layer;

plasma-etching said second multilayer interference color filter layer with said second etching mask, thereby obtaining second interference color filter elements covered with said second etching mask and second uncovered areas of said carrier;

preparing a third multilayer interference color filter layer upon said second etching mask and said second uncovered areas; and lifting off said first and second etching masks, thereby lifting off said third multilayer interference color filter layer.

19. The method according to claim 18, wherein the coating of the first interference color filter element is effected by one of a PVD, CVD and PECVD process.

20. The method according to claim 19, wherein the etching is effected by one of AC, DC or AC/DC plasma etching and reactive and non-reactive etching.

21. The method according to claim 20, wherein the etching mask is one of Al or Cr metal and lacquer.

22. The method according to claim 18, wherein more than one different interference color filter element is prepared successively by coating and etching, and the last interference color filter element is prepared by a lift-off technique.

23. A method of manufacturing an interference color filter system with more than two filter elements on a common carrier, comprising (a) preparing all the filter elements by masking and plasma etching, and (b) removing more than one etching mask and interference layers deposited thereupon in a common liftoff step.

* * * * *